Sept. 22, 1964  H. F. W. MARUHN  3,149,409
METHOD OF PRODUCING AN ENGINE PISTON WITH
A HEAT INSULATING LAYER
Filed Nov. 28, 1960
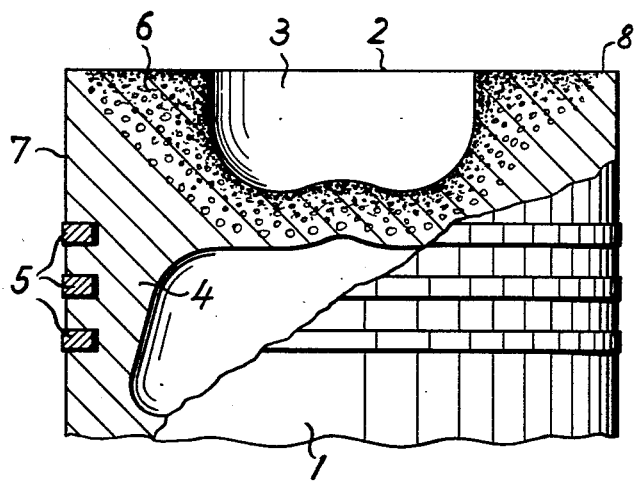
INVENTOR
HERBERT F. W. MARUHN
BY *Dicke, Craig & Freudenberg*
ATTORNEYS United States Patent Office 3,149,409
Patented Sept. 22, 1964

3,149,409
METHOD OF PRODUCING AN ENGINE PISTON WITH A HEAT INSULATING LAYER
Herbert F. W. Maruhn, Stuttgart-Uhlbach, Germany, assignor to Daimler-Benz Aktiengesellschaft, Stuttgart-Unterturkheim, Germany
Filed Nov. 28, 1960, Ser. No. 72,104
Claims priority, application Germany Dec. 1, 1959
1 Claim. (Cl. 29—156.5)

The present invention relates to improvements in internal combustion engines and more particularly to an engine piston which is provided with a heat-insulating layer on or within the surface of the piston which is exposed to the heat of the combustion gases, and it further relates to a method of producing such a heat-insulating layer by means of mineral substances, preferably of a ceramic type.

It is an object of the present invention to provide an engine piston, especially one of light metal, in which the piston head is provided with a recess forming a part of the combustion chamber, and in which the parts of the piston head which are especially exposed to the heat of combustion are protected by a heat-insulating layer which is produced by heating the piston head to have a doughy consistency and by then embedding mineral substances in a pulverulent or granular form within the surface layer of the piston head. In this manner it is possible to provide the piston by a relatively simple and inexpensive procedure with a very efficient heat-insulating layer at the surface which is exposed to the heat of the combustion chamber, and especially the surface of an open recess in a piston head which serves as a part of the combustion chamber as well the annular surface part of the piston head around this recess, so that these parts will be protected from the effects of the high combustion temperatures. The method according to the invention of producing such a heat-insulating layer has the further advantage that the mineral substances will be intimately combined with the material of the piston on and adjacent to the surfaces of the piston head which should be protected, and regardless of the particular shape of these surfaces. A further great advantage of the new method is the fact that it permits the mineral substances to be easily embedded in the material of the piston at whatever amount or concentration and manner of distribution as may be desired and, for example, in such a manner that the heat-insulating effect of the embedded substances will gradually decrease toward the lower parts of the piston. A gradual reduction in the heat barrier is advantageous because a sharp line of demarkation between the heat insulating portion of the piston and the remainder of the piston would result in non-uniform expansion of the piston, its warping, and eventually in so-called freezing of the piston within its cylinder. The gradual decrease in the heat insulating effect according to the present invention avoids the above disadvantages and accordingly substantially increases the useful life of the piston.

Another feature of the invention consists in embedding the mineral substances in the piston head by pressing or shooting the substances into the piston head preferably by means of compressed air.

Another feature and special advantage of the invention is the fact that it also permits the mineral substances to be forced into the material of the piston head in a manner so that the density of the mineral substances will be greater on or adjacent to the surface of the piston head than more deeply within the piston head. For example, by injecting substances which are primarily fine grained, but which have some coarser grains mixed therein. The finer grains will be embedded adjacent the surface of the piston. The coarser grains, due to their greater mass, will penetrate a greater depth into the piston material than will the finer grains. Since the amount of finer grains predominate, the concentration of embedded material will decrease inwardly from the surface of the piston.

In order to permit the annular part of the piston along the piston shaft to be worked upon after the mineral substances have been embedded, and also to prevent the antifriction properties of the annular part of the piston from being affected by the mineral substances, it is also possible according to the invention to embed the mineral substances in a manner so that the peripheral surfaces of the piston head will be free of these substances, for example, by covering an annular portion of the top surface of the piston head adjacent to the outer edge thereof, while the mineral substances are being impressed into the material inwardly of this annular portion.

The above-mentioned objects, features, and advantages of the invention will become further apparent from the following detailed description thereof which is to be read with reference to the accompanying drawing of the upper part of a piston which is treated in accordance with the method according to the invention.

In this drawing which shows, largely in cross section, a piston 1 of light metal, the piston head 2 is shown as being provided with an open recess 3 serving as a combustion chamber. In order to insure that, when the engine is running under a partial load, the wall of this combustion chamber 3 will have a sufficiently high temperature, and in order to prevent the piston part 4 near the piston rings 5 from being excessively heated when the engine is running under full load, mineral substances 6, for example, of a ceramic type, are embedded in a pulverulent or granular form into the material of piston head 2 which for this purpose is heated to a doughy consistency. The mineral substances 6 are preferably distributed in the material of the piston head in such a manner that a large number of small grains are embedded in a dense concentration in the top surface of the piston head and also in the wall of the combustion chamber 3, while a smaller number of grains and preferably also of a larger size are distributed more deeply in the piston head and adjacent to the area containing the many small grains.

In order to protect the anti-friction properties of the upper piston part 7 above piston rings 5 from being affected by the granular mineral substances 6, and also to permit the piston to be easily machined after these substances have been embedded therein, this part 7 of the piston is left free of any mineral substances. This may be done in a very simple manner by covering the peripheral surface of the part 7 and also an annular part 8 of the top surface of the piston head during the process of embedding the mineral substances 6 in which these substances are forced into the material from the upper side of the piston head.

The embedding operation is preferably carried out by first heating the piston head to a doughy consistency and by then impressing or shooting the mineral substances into the desired parts by means of compressed air which is preferably heated. This may be done, for example, by means of an apparatus similar to a sand-blast blower. The embedding operation may, however, also be carried out by electro-static or magnetic means, either alone or in combination with a compressed-air current.

By embedding the mineral substances 6 in the manner as above described and as illustrated in the drawing, a heat-insulating effect may be attained which gradually decreases from the upper surface of the piston head and also from the wall of combustion chamber 3 toward the inside of the piston head. By selecting mineral substances of suitable granular sizes, and possibly also of different granular sizes during the course of the embedding operation, and by distributing them in the most desirable manner, it is possible to provide piston heads with any desired degree of heat insulation in accordance with the particular type of piston and the particular type of internal combustion engine in which the piston is to be used.

Although my invention has been illustrated and described with reference to the preferred embodiment thereof, I wish to have it understood that it is in no way limited to the details of such embodiment, but is capable of numerous modifications within the scope of the appended claim.

Having thus fully disclosed my invention, what I claim is:

For an engine piston having a head with a surface exposed to temperatures of combustion gases and a peripheral bearing wall, the method of treating said head so that there is presented a gradual decrease in heat-resistance in the portion of said head extending inwardly of said surface and spaced from said peripheral wall, said method including the steps of heating said surface to a doughy consistency, covering an annular portion of said surface adjacent to said peripheral bearing wall, and embedding particulate substances of varying size having heat insulation properties at least primarily beneath the inner portion of said surface surrounded by said annular portion while decreasing the density of the embedded substance in directions away from said inner portion toward the interior of said piston, said particulate substances being of ceramic material and of varying size including comparatively fewer large particles than smaller particles, said embedding step comprising spraying said particles having heat-insulating properties against said inner portion of said surface so as to embed said particles within and beneath said inner portion, said spraying being effective to embed said large particles more deeply than said small particles, and said covering step being effective for the purpose of preventing said peripheral bearing wall from receiving any of said particles of ceramic material during said embedding step.

References Cited in the file of this patent

UNITED STATES PATENTS

| | | |
|---|---|---|
| 1,490,849 | Philip | Apr. 15, 1924 |
| 2,075,388 | De Cloud | Mar. 30, 1937 |
| 2,311,039 | Emery | Feb. 16, 1943 |
| 2,657,961 | Von Lassberg | Nov. 3, 1953 |
| 2,685,729 | Daub | Aug. 10, 1954 |
| 2,714,563 | Poorman et al. | Aug. 2, 1955 |
| 2,833,264 | Dailey et al. | May 6, 1958 |